US008152883B2

(12) United States Patent
Lee

(10) Patent No.: US 8,152,883 B2
(45) Date of Patent: Apr. 10, 2012

(54) CYCLONE CHAMBER WITH VORTEX SHIELD

(75) Inventor: Yiu-Ming Lee, Wan Chai (CN)

(73) Assignee: Prime Sourcing Limited, Wan Chai, Hong Kong (CN)

( * ) Notice: Subject to any disclaimer, the term of this patent is extended or adjusted under 35 U.S.C. 154(b) by 133 days.

(21) Appl. No.: 12/747,564

(22) PCT Filed: Dec. 12, 2008

(86) PCT No.: PCT/CN2008/002006

§ 371 (c)(1), (2), (4) Date: Jun. 11, 2010

(87) PCT Pub. No.: WO2009/086733

PCT Pub. Date: Jul. 16, 2009

(65) Prior Publication Data

US 2010/0263341 A1 Oct. 21, 2010

(30) Foreign Application Priority Data

Dec. 12, 2007 (GB) .................................. 0724228.2

(51) Int. Cl.
*B01D 45/12* (2006.01)

(52) U.S. Cl. ............. 55/459.1; 55/337; 55/429; 55/426; 55/447; 55/DIG. 3; 55/413; 55/414; 15/352; 15/353

(58) Field of Classification Search .................... 55/337, 55/DIG. 3, 447, 459.1, 428, 429, 413, 414, 55/424, 426; 15/352, 353
See application file for complete search history.

(56) References Cited

U.S. PATENT DOCUMENTS

| | | | | |
|---|---|---|---|---|
| 6,090,174 | A | 7/2000 | Douma et al. | |
| 6,896,711 | B2 | 5/2005 | Oh | |
| 7,422,615 | B2 * | 9/2008 | Kim | 55/426 |
| 7,547,351 | B2 * | 6/2009 | Oh et al. | 95/271 |
| 7,559,964 | B2 * | 7/2009 | Oh et al. | 55/424 |
| 7,637,973 | B2 * | 12/2009 | Oh et al. | 55/337 |
| 7,708,791 | B2 * | 5/2010 | Oh et al. | 55/345 |
| 7,744,667 | B2 * | 6/2010 | Oh et al. | 55/343 |
| 7,780,752 | B2 * | 8/2010 | Cha et al. | 55/288 |
| 7,785,381 | B2 * | 8/2010 | Oh et al. | 55/300 |
| 7,794,515 | B2 * | 9/2010 | Oh et al. | 55/343 |
| 7,803,205 | B2 * | 9/2010 | Oh et al. | 55/337 |
| 7,854,779 | B2 * | 12/2010 | Oh | 55/337 |
| 2005/0252179 | A1 * | 11/2005 | Oh et al. | 55/337 |
| 2007/0079587 | A1 * | 4/2007 | Kim | 55/349 |

(Continued)

FOREIGN PATENT DOCUMENTS

CN 1244447 A 2/2000

(Continued)

*Primary Examiner* — Jason M Greene
*Assistant Examiner* — Dung H Bui
(74) *Attorney, Agent, or Firm* — Alix, Yale & Ristas, LLP

(57) ABSTRACT

A cyclone chamber for a vacuum cleaner includes a cylindrical wall defining an internal cavity. An inlet port extends tangentially from the wall such that air entering the cavity via the inlet port causes a cyclonic flow to develop within the chamber. An exit tube extends axially from the chamber and has a flared opening presented into the chamber. A vortex shield is centered axially within the chamber adjacent to the opening and extends radially from the opening toward the wall. The vortex shield forms a barrier to prevent in the most part, large but light weight particles, carpet fibers and the like from escaping into the exit tube.

4 Claims, 1 Drawing Sheet

U.S. PATENT DOCUMENTS

| | | | | |
|---|---|---|---|---|
| 2008/0047091 | A1* | 2/2008 | Nguyen | 15/300.1 |
| 2009/0165431 | A1* | 7/2009 | Oh | 55/337 |
| 2009/0178378 | A1* | 7/2009 | Bertram et al. | 55/391 |
| 2009/0205162 | A1* | 8/2009 | Oh et al. | 15/353 |
| 2009/0217635 | A1* | 9/2009 | Bertram et al. | 55/428 |
| 2010/0024367 | A1* | 2/2010 | Howes | 55/447 |
| 2010/0162517 | A1* | 7/2010 | Han et al. | 15/352 |
| 2010/0299865 | A1* | 12/2010 | Conrad | 15/353 |
| 2010/0299866 | A1* | 12/2010 | Conrad | 15/353 |

FOREIGN PATENT DOCUMENTS

| | | | |
|---|---|---|---|
| CN | 2922759 | Y | 7/2007 |
| CN | 101049222 | A | 10/2007 |

* cited by examiner

CYCLONE CHAMBER WITH VORTEX SHIELD

BACKGROUND OF THE INVENTION

The present invention relates to vacuum cleaner cyclones. More particularly, although not exclusively, the invention relates to a cyclonic chamber for a vacuum cleaner having special internal features for preventing in the most part, large but light weight particles, carpet fibres and the like from escaping through the exit tube.

Known in the art are multi-cyclone vacuum cleaning systems in which a primary cyclone chamber is designed to extract large dust, debris and/or fluff particles entrained in the vacuumed air stream. The primary cyclone feeds a downstream secondary cyclone or cyclones designed for extracting finer particles from the airflow.

A problem with such systems is that large but light weight particles, fibres, hair and the like tend to flow to the exit tube. To prevent the debris from exiting the chamber, common methods such as fine mesh screens or filters are used. These methods provide a barrier for the fibres and hair to accumulate and subsequently reduced the performance of the vacuum cleaner.

An object is to overcome or substantially ameliorate the above disadvantage and/or more generally to provide an improved vacuum cleaner cyclone.

SUMMARY

There is disclosed herein a cyclone chamber for a vacuum cleaner, comprising:

- a substantially cylindrical wall defining an internal cavity;
- an inlet port extending substantially tangentially from the wall such that air entering the cavity via the inlet port will cause a cyclonic flow within the chamber;
- an exit tube extending substantially axially from the chamber and comprising an opening presented into the chamber; and
- a vortex shield centred substantially axially within the chamber adjacent to the opening and extending from the opening toward the wall.

Preferably, the exit tube opening is flared toward the wall of the chamber.

Preferably, the vortex shield comprises a substantially circular barrier having a substantially frustoconical skirt extending therefrom.

Preferably, the flared opening together with the skirt defines a convergent annulus via which air from the chamber enters the exit tube.

Preferably, the opening of the exit tube is surrounded by a substantially cylindrical face defining together with a portion of the chamber wall an entry annulus at which the inlet port enters the chamber.

BRIEF DESCRIPTION OF THE DRAWINGS

A preferred form of the present invention will now be described by way of example with reference to the accompanying drawings, wherein.

DESCRIPTION OF THE PREFERRED EMBODIMENT

Figure 1:
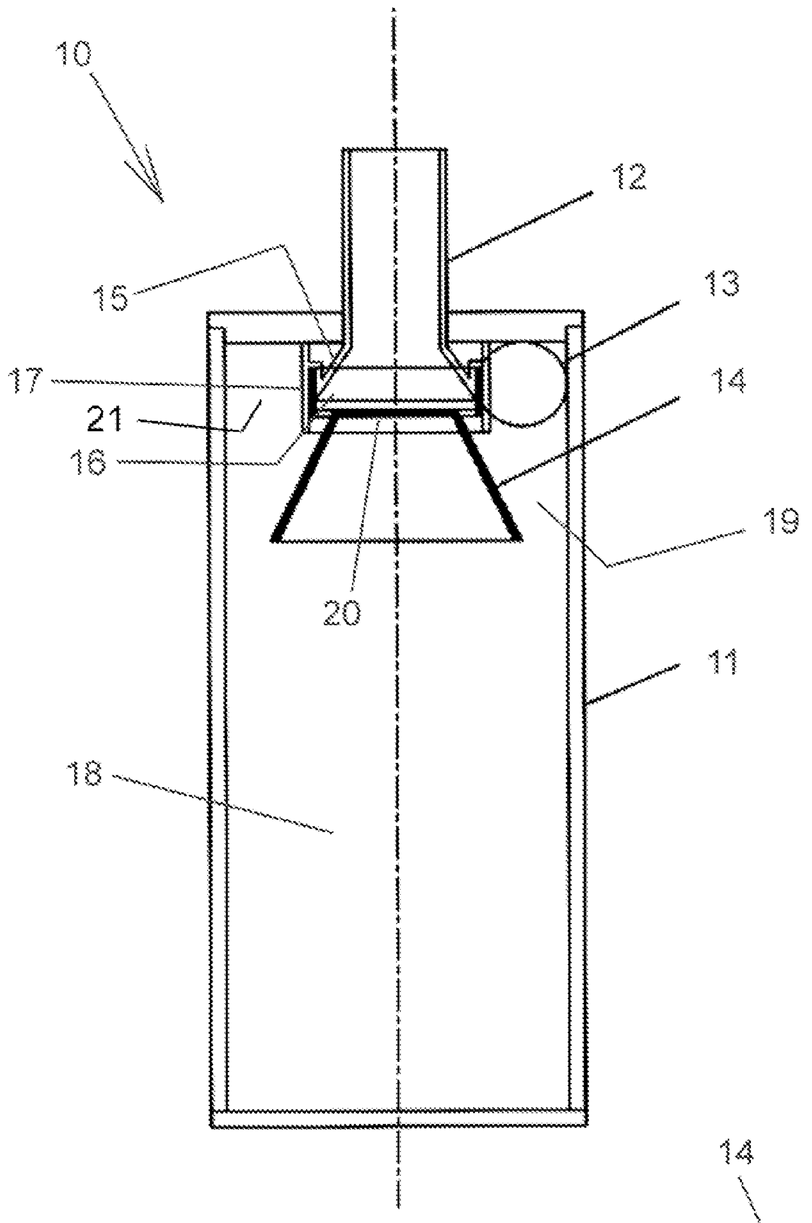
FIG. 1 is a schematic cross-sectional elevation of a cyclone chamber.
Figure 2:
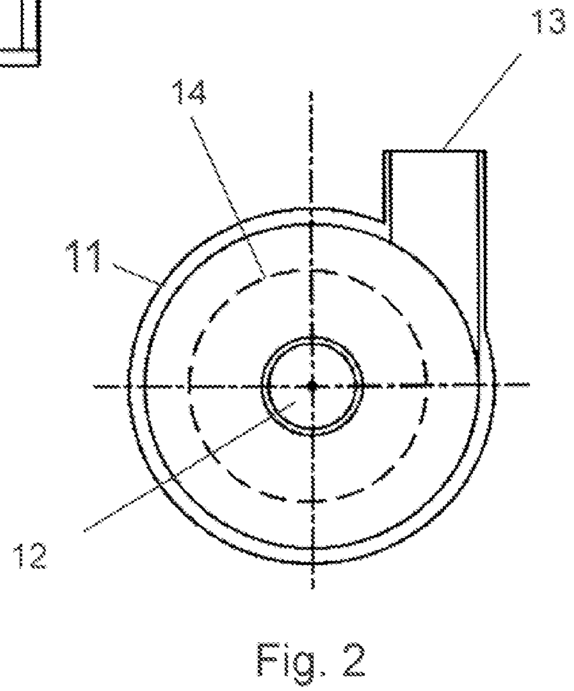
FIG. 2 is a schematic plan view of the cyclone chamber of FIG. 1.

In the accompanying drawings there is depicted schematically a cyclone 10 which would typically be used as the primary cyclone of a multi-cyclone vacuum cleaner in which a secondary cyclone or cyclones are situated downstream.

The cyclone 10 comprises a cylindrical wall 11 defining a chamber 18 for receiving the dust, fluff and/or other debris.

An inlet port 13 extends tangentially of the wall 11. An air exit tube 12 extends axially into the top of the cyclone 10. Low pressure in the exit tube 12 caused by a downstream pump induces low pressure in the chamber 18 which causes air to be drawn in via inlet port 13.

The exit tube 12 includes a flared opening 15 surrounded by a cylindrical face/frame 17. The upper portion of the chamber wall 11 and the cylindrical face 17 define an annulus 21 into which air from the inlet port 13 is received to form a clockwise rotating cyclonic airflow within the chamber 18. Of course, if the inlet tube were configured differently, the airflow direction might be anticlockwise.

Positioned beneath the flared opening 15 and supported by the face/frame 17 (or alternatively by the chamber wall 11) is a vortex shield comprising a flat circular barrier 20 having a frustoconical skirt 14 extending downwardly and outwardly therefrom. The skirt 14 extends downwardly into the chamber 18 and outwardly toward the chamber wall 11 to define an annular extraction area 19. Small particulate/light weight air-entrained dust flows upwardly into the extraction area 19 about the periphery of the skirt 14.

The flared opening 15 together with the upper portion of the skirt 14 defines a convergent annulus 16 via which the small particulate/light weight air-entrained dust from the extraction area 19 is drawn into the exit tube 12.

In use, large particulate material (fluff, debris, hair and dust for example) can cause a large swirling clump to develop within the dust containment area 18. The barrier 20 and skirt 14 of the vortex shield effectively prevents such clumps from being drawn up into the exit tube 12. At the same time, the convergent annulus 16 causes an upward flow of air about the skirt 14 which is extracted from the dust containment area 18 via the extraction area 19 which is radially outward and close to the chamber wall 11 where the lighter dust particles are located in the cyclonic airflow.

It should be appreciated that modifications and alterations obvious to those skilled in the art are not to be considered as beyond the scope of the present invention. For example, rather than providing a flat circular barrier 20, the skirt 14 could be conical with a point extending more highly into the opening 15. The vortex shield might even be dome-shaped. As a further alternative, the opening 15 might not be flared, but instead merely be sufficiently wide as to cooperate with the vortex shield in a manner as described.

The invention claimed is:

1. A cyclone chamber for a vacuum cleaner, comprising:

- a substantially cylindrical wall defining an internal cavity;
- an inlet port extending substantially tangentially from the wall such that air entering the cavity via the inlet port will cause a cyclonic flow within the chamber;
- an exit tube extending substantially axially from the chamber and comprising an opening presented into the chamber; and
- a vortex shield centred substantially axially within the chamber adjacent to the opening and extending from the opening toward the wall wherein the vortex shield comprises a substantially circular barrier having a substantially frustoconical skirt extending therefrom.

2. The cyclone chamber of claim 1, wherein the exit tube opening is flared toward the wall of the chamber and together with the skirt defines a convergent annulus via which air from the chamber enters the exit tube.

3. The cyclone chamber of claim 1, wherein the exit tube opening is flared toward the wall of the chamber.

4. The cyclone chamber of claim 3, wherein the flared opening is surrounded by a substantially cylindrical face defining together with a portion of the chamber wall an entry annulus at which the inlet port enters the chamber.

* * * * *